United States Patent
Kambe et al.

(10) Patent No.: US 10,783,117 B2
(45) Date of Patent: Sep. 22, 2020

(54) ENGINEERING APPARATUS, ENGINEERING METHOD, AND STORAGE MEDIUM

(71) Applicant: Yokogawa Electric Corporation, Tokyo (JP)

(72) Inventors: Takahiro Kambe, Singapore (SG); Hiroshi Iriguchi, Tokyo (JP); Takaaki Matsuda, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 245 days.

(21) Appl. No.: 15/892,596

(22) Filed: Feb. 9, 2018

(65) Prior Publication Data
US 2018/0231960 A1    Aug. 16, 2018

(30) Foreign Application Priority Data
Feb. 13, 2017  (JP) ................. 2017-024086

(51) Int. Cl.
*G06F 16/17*    (2019.01)
*G06F 16/21*    (2019.01)
(Continued)

(52) U.S. Cl.
CPC ......... *G06F 16/1734* (2019.01); *G05B 19/00* (2013.01); *G06F 16/13* (2019.01);
(Continued)

(58) Field of Classification Search
CPC ........ G06F 16/219; G06F 16/23; G05B 19/00
See application file for complete search history.

(56) References Cited

U.S. PATENT DOCUMENTS

| | | | |
|---|---|---|---|
| 9,495,421 B1* | 11/2016 | DeHaan | G06F 16/258 |
| 2009/0118846 A1* | 5/2009 | Eldridge | G05B 15/02 |
| | | | 700/86 |
| 2017/0024253 A1* | 1/2017 | Ohmiya | H04L 12/6418 |

FOREIGN PATENT DOCUMENTS

| | | |
|---|---|---|
| JP | 2000-172303 A | 6/2000 |
| JP | 3796645 B2 | 7/2006 |

OTHER PUBLICATIONS

V.-H., B., et al., "Selected Challenges of Software Evolution for Automated Production Systems", 2015 IEEE 13th International Conference on Industrial Informatics, Jul. 22, 2015, pp. 314-321, XP033218800.

* cited by examiner

*Primary Examiner* — Dennis Truong
(74) *Attorney, Agent, or Firm* — Sughrue Mion, PLLC

(57) ABSTRACT

An engineering apparatus that is used for supporting engineering of facilities in an industrial plant according to one aspect of the present invention includes a storage storing a first data file group including first data files, the first data files including element information indicating one or a plurality of functional blocks that are constituent elements of a control logic for controlling operation of the industrial plant, a processor configured to change the element information included in the first data files, and a determiner configured to acquire a second data file group including second data files, the second data files including the changed element information in another engineering apparatus, extract differential files including the changed element information from each of the first data file group and the second data file group, and determine whether there is mismatching between functional blocks indicated by the element information included in the differential files.

17 Claims, 6 Drawing Sheets

(51) Int. Cl.
   *G06F 16/13*      (2019.01)
   *G05B 19/00*      (2006.01)
   *G05B 19/418*     (2006.01)
   *G06F 16/23*          (2019.01)
(52) U.S. Cl.
   CPC .. *G06F 16/219* (2019.01); *G05B 2219/35082* (2013.01); *G06F 16/23* (2019.01)

ENGINEERING APPARATUS, ENGINEERING METHOD, AND STORAGE MEDIUM

BACKGROUND OF THE INVENTION

Field of the Invention

The present invention relates to an engineering apparatus, an engineering method, and a storage medium.

The present application claims priority based on Japanese patent application 2017-024086, filed on Feb. 13, 2017 and includes herein by reference the content thereof.

Description of Related Art

An industrial plant generally requires continuous operation over a long period. For example, there are cases in which operations of 24 hours a day and 365 days a year for 30 years are set as a principle. Meanwhile, compared to the long period of years over which an industrial plant operates, technology trends and business environments quickly change in a short period, and there are cases in which following and responding to such changes is necessary and appropriate. Conventionally, when engineering data is corrected, the operation of a plant is stopped, and the engineering data is corrected and changed. However, there are cases in which the correction of engineering data is requested frequently. Meanwhile, it is important to improve the operation rate of a plant from a business aspect, and there are cases in which stopping the operation of the plant every time the engineering data is corrected or changed is a problem. In order to solve this, for example, an online maintenance technology enabling a correction and a change in engineering data while maintaining the operation of an industrial plant has been proposed as in the inventions disclosed in Japanese Patent No. 3796645 (hereinafter, referred to as Patent Document 1) and Japanese Unexamined Patent Application, First Publication No. 2000-172303 (hereinafter, referred to as Patent Document 2).

According to such an online maintenance technology, while engineering data can be corrected or changed in a timely manner without stopping the operation of a plant, engineering data after change is applied to facility devices configuring the plant that are in the middle of operation. For this reason, there are cases in which there is a negative impact on the operation of a plant due to a malfunction of the operation of each device occurring in accordance with the correction or the change. For example, for an extension or an alteration of a facility device for operating a plant, in a case in which the amount of the extension or the alteration is relatively large, there are cases in which directly performing engineering using the online maintenance technology has negative impact on the operation of a plant. Accordingly, in a replicated system of a control system realizing the operation of a plant, online maintenance is performed after the operation after the correction or change of the engineering data is checked.

In recent years (as of 2017), particularly, the amount of alteration or the complexity has been increasing due to increases in the scale, the complexity, and the like of plants, and there are cases in which a malfunction or the like after a correction or change has increased.

In Patent Document 1, an online maintenance method of decreasing the amount of data and a reflection time by limiting engineering data to be reflected in a control apparatus to a corrected or changed range has been disclosed.

As described above, after engineering data corrected or changed through engineering is reflected in a control system, it is important to check that no malfunction occurs in the operation in advance. In Patent Document 2, it has been described that a difference between a database generated by re-evaluating sources at the time of online maintenance and an existing database inside a control station is detected, and a warning relating to an operation occurring due to the difference is displayed on a display. By using such a method, a local problem at the time of execution of online maintenance can be solved. However, according to the advance in technologies, the scale of the control system becomes large, and the control system becomes complicated. An industrial plant that is a control target needs to be reformed in accordance with rapid changes in business environments. In other words, it is important to follow and respond to changes in the technology trends and the business environments.

In this case, there are cases in which engineering data is requested to be corrected or changed in accordance with the extension or alteration of an industrial plant. The correction or change of the engineering data is generally performed in a replicated control system that is a separate control system simulating an on-site control system. This is because there is no direct negative impact on the operation of a plant due to a malfunction of each device occurring due to a correction or a change, in other words, there is no direct negative impact on the on-site control system. The on-site control system represents a control system controlling the operation of an industrial plant that is actually operated. As engineering data that is a target to be corrected or changed, a replication of engineering data applied in the on-site control system is used. There are cases in which an operation checking test is performed using a control system including devices similar to those of the on-site control system or a simulator that calculates measured values acquired by the on-site control system as a replicated control system. Then, when a correction or a change occurs, a corrected file in which engineering data relating to the correction or change is stored is transferred to and reflected in the on-site control system, and the operation is checked in the on-site control system.

SUMMARY OF THE INVENTION

After engineering is completed in the replicated control system, it is necessary for an engineer to individually extract each change point that is necessary to be reflected in the on-site control system. In this process, there is a possibility of an error occurring in an operation due to a human error or the like. There are cases in which considerable time is consumed for the extraction. The number of files to be corrected tends to increase in accordance with an increase in the scale and the complexity of the control system. For this reason, there are cases in which, between the on-site control system and the replicated control system, the loss, alteration, leakage, and the like in the process of delivery or transmission of the engineering data are occurred. There is a possibility that, before corrected content according to the engineering is reflected in the on-site control system, the engineering data after correction may be reflected in the on-site control system in a state in which data mismatching occurs without a difference from latest engineering data being detected in the on-site control system. However, such a possibility, for example, may occur in a case in which engineering data is changed in the on-site control system independently from the replicated control system. Since the plant is in the middle of operation, after the engineering data is corrected or changed in the replicated control system, the engineering data may be updated for each day in the on-site control system. According to such an update, there is also a possibility of data mismatching.

One aspect of the present invention provides an engineering apparatus, an engineering method, and a storage medium capable of improving the efficiency of an engineering operation, in other words, enabling an operation in a short time by accurately recognizing a change point at which reflection is required in a short time and reducing an error in the engineering operation such as transition and reflection of data.

An engineering apparatus that is used for supporting engineering of facilities in an industrial plant according to a first aspect of the present invention may include a storage storing a first data file group including first data files, the first data files including element information indicating one or a plurality of functional blocks that are constituent elements of a control logic for controlling operation of the industrial plant, a processor configured to change the element information included in the first data files, and a determiner configured to acquire a second data file group including second data files, the second data files including the changed element information in another engineering apparatus, extract differential files including the changed element information from each of the first data file group and the second data file group, and determine whether there is mismatching between functional blocks indicated by the element information included in the differential files.

In the above described engineering apparatus, the determiner may be configured to determine whether there is mismatching in an input and output path between the functional blocks.

In the above described engineering apparatus, the mismatching between the functional blocks may indicate overlapping names of the functional blocks or inappropriateness of a type of a functional block that is an input or output connection target designated in the input and output path. The mismatch of the input and output path between the functional blocks may indicate a state including at least one of overlapping and missing of functional blocks that are input or output connection targets designated in the input and output path.

In the above described engineering apparatus, the storage may store a definition file including previously defined information, the previously defined information indicating a part of input and output paths between the functional blocks. Each of the first data file group and the second data file group may include an individual file including information of another part of the input and output paths. The determiner may be configured to detect mismatching between the input and output paths from the information of the another part of the input and output paths included in the individual file among the differential files.

In the above described engineering apparatus, the data file may be formed for each control loop of a control apparatus used for controlling operation of the industrial plant.

In the above described engineering apparatus, the data file may be formed for each combination of a plurality of control loops of a control apparatus used for controlling operation of the industrial plant.

In the above described engineering apparatus, the first data file group may further include a third data file, the third data file including an input and output setting of a field device for each control loop. The second data file group may further include a fourth data file, the fourth data file including the input and output setting. The determiner may be configured to extract second differential files including a changed input and output setting from each of the first data file group and the second data file group, and detect mismatching of the input and output setting included in the extracted second differential files.

In the above described engineering apparatus, the first data file group may further include a third data file, the third data file including an input and output setting of a field device for each control loop. The second data file group may further include a fourth data file, the fourth data file including the input and output setting. The determiner may be configured to extract second differential files including a changed input and output setting from each of the first data file group and the second data file group, and detect mismatching between the input and output setting included in the extracted second differential files and the input and output path of the functional block indicated by the element information included in the differential file.

In the above described engineering apparatus, the processor may be configured to integrate the differential file and the data file including the element information that has not been changed and input an integrated file into a control apparatus used for controlling operation of the industrial plant in a case that the determiner determines that there is no mismatching between the functional blocks and the input and output path.

An engineering method according to a second aspect of the present invention using an engineering apparatus that is used for supporting engineering of facilities in an industrial plant and includes a storage storing a first data file group including first data files, the first data files including element information indicating one or a plurality of functional blocks that are constituent elements of a control logic for controlling operation of the industrial plant, the engineering method may include changing the element information included in the first data files, acquiring a second data file group including second data files, the second data files including the changed element information in another engineering apparatus, extracting differential files including the changed element information from each of the first data file group and the second data file group, and determining whether there is mismatching between functional blocks indicated by the element information included in the differential files.

The above described engineering method may further include determining whether there is mismatching in an input and output path between the functional blocks.

In the above described engineering method, the mismatching between the functional blocks may indicate overlapping names of the functional blocks or inappropriateness of a type of a functional block that is an input or output connection target designated in the input and output path. The mismatch of the input and output path between the functional blocks may indicate a state including at least one of overlapping and missing of functional blocks that are input or output connection targets designated in the input and output path.

In the above described engineering method, the storage may store a definition file including previously defined information, the previously defined information indicating a part of input and output paths between the functional blocks. Each of the first data file group and the second data file group may include an individual file including information of another part of the input and output paths. Determining whether there is mismatching in the input and output path between the functional blocks may include detecting mismatching between the input and output paths from the information of the another part of the input and output paths included in the individual file among the differential files.

In the above described engineering method, the data file may be formed for each control loop of a control apparatus used for controlling operation of the industrial plant.

In the above described engineering method, the data file may be formed for each combination of a plurality of control loops of a control apparatus used for controlling operation of the industrial plant.

In the above described engineering method, the first data file group may further include a third data file, the third data file including an input and output setting of a field device for each control loop. The second data file group may further include a fourth data file, the fourth data file including the input and output setting. The engineering method may further include extracting second differential files including a changed input and output setting from each of the first data file group and the second data file group, and detecting mismatching of the input and output setting included in the extracted second differential files.

In the above described engineering method, the first data file group may further includes a third data file, the third data file including an input and output setting of a field device for each control loop. The second data file group may further include a fourth data file, the fourth data file including the input and output setting. The engineering method may further include extracting second differential files including a changed input and output setting from each of the first data file group and the second data file group, and detecting mismatching between the input and output setting included in the extracted second differential files and the input and output path of the functional block indicated by the element information included in the differential file.

The above described engineering method may further include integrating the differential file and the data file including the element information that has not been changed and input an integrated file into a control apparatus used for controlling operation of the industrial plant in a case that it is determined that there is no mismatching between the functional blocks and the input and output path.

A non-transitory computer-readable storage medium storing a program according to a third aspect of the present invention, which when executed by a computer of an engineering apparatus that is used for supporting engineering of facilities in an industrial plant and includes a storage storing a first data file group including first data files, the first data files including element information indicating one or a plurality of functional blocks that are constituent elements of a control logic for controlling operation of the industrial plant, may cause the computer to change the element information included in the first data files, and acquire a second data file group including second data files, the second data files including the changed element information in another engineering apparatus, extract differential files including the changed element information from each of the first data file group and the second data file group, and determine whether there is mismatching between functional blocks indicated by the element information included in the differential files.

In the above described non-transitory computer-readable storage medium, the program may further cause the computer to determine whether there is mismatching in an input and output path between the functional blocks.

According to the one aspect of the present invention, the efficiency of an engineering operation can be improved, in other words, an operation is enabled to be executed in a short time by accurately perceiving a change point at which reflection is required and reducing an error in the engineering operation such as transition and reflection of data.

DETAILED DESCRIPTION OF THE INVENTION

Hereinafter, an engineering apparatus, an engineering method, and a storage medium according to an embodiment of the present invention will be described with reference to the drawings.

(Engineering System)

First, one example of the configuration of an engineering system according to this embodiment will be described.

Figure 1:
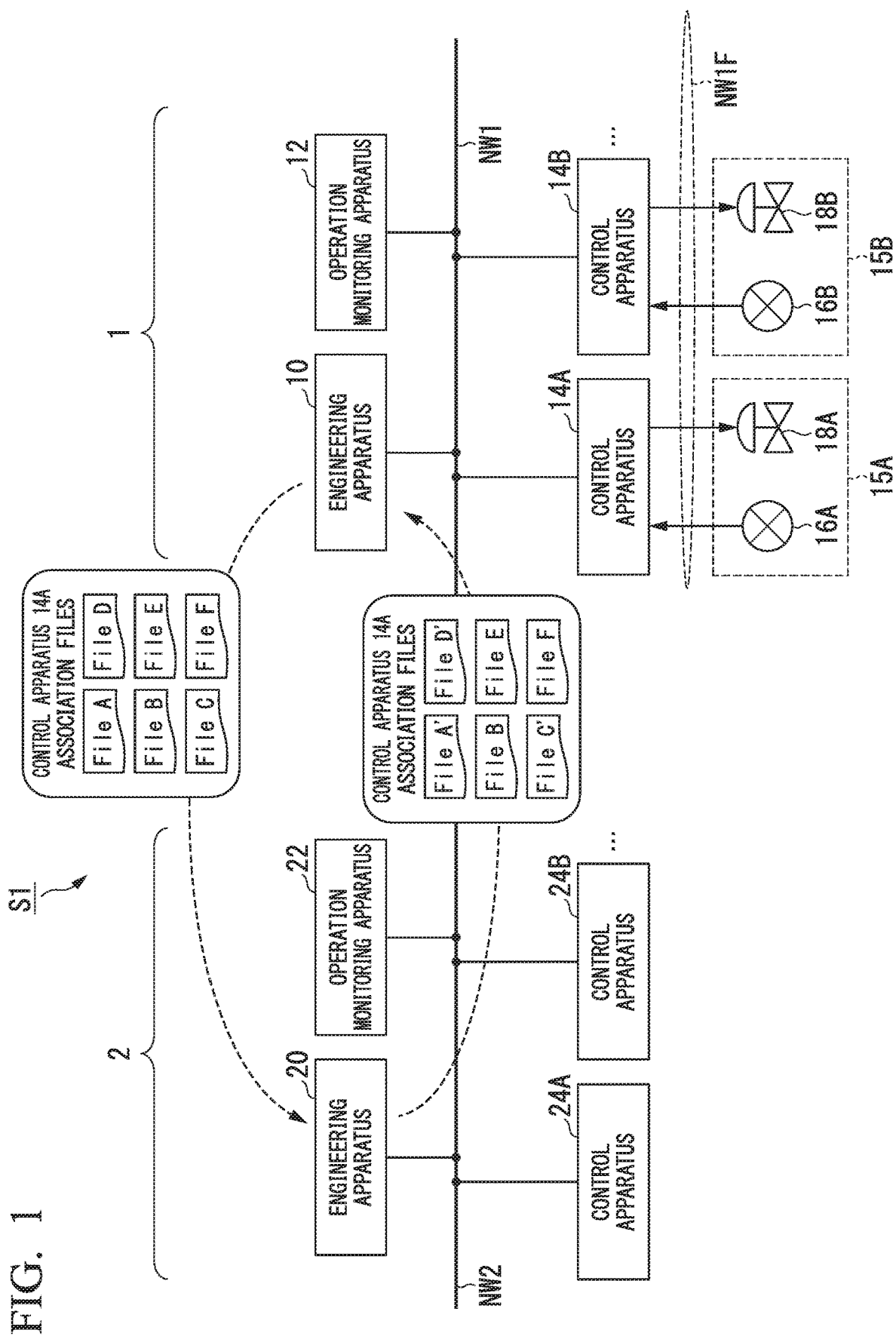
FIG. 1 is a block diagram showing one example of the configuration of an engineering system according to this embodiment.

FIG. 1 is a block diagram showing one example of the configuration of the engineering system according to this embodiment.

The engineering system S1 includes an on-site control system 1 and a replicated control system 2. The on-site control system 1 is a control system that is installed on-site at plants 15A and 15B that are control targets and controls the operation states thereof. The on-site control system 1 is a process control system which includes an engineering apparatus 10, an operation monitoring apparatus 12, a control apparatus 14A, and a control apparatus 14B. The engineering apparatus 10, the operation monitoring apparatus 12, the control apparatus 14A, and the control apparatus 14B are connected to a control network NW1 and transmit or receive various kinds of data through the control network NW1 in a wired or wireless manner. In the following description, in a case in which a plurality of control apparatuses are collectively referred to or are not to be discriminated from each other, each thereof may be referred to as a control apparatus 14. In a case in which a plurality of plants are collectively referred to or are not to be discriminated from each other, each thereof may be referred to as a plant 15.

The engineering apparatus 10 is used for supporting engineering of each control apparatus 14. In the engineering of a control apparatus, there are processes such as designing, generation, updating, and deletion of a part or all of the program to be executed by the control apparatus, installation of the program in the control apparatus, setting, updating, or deletion of parameters used for the process, management of a change history, an operation test, and the like. The engineering is performed in accordance with an operation of an engineer performing maintenance of the engineering system S1. The execution of a program represents execution of a process directed by a command described in the program. The functional configuration of the engineering apparatus 10 will be described later.

The operation monitoring apparatus 12 is a human machine interface (HMI) used for an operator to monitor the operation state of each plant 15 and manipulate the operation of each plant 15. The operation monitoring apparatus 12 includes input devices such as a switch, a keyboard, and a mouse used for manipulating the operation of each plant 15. The operation monitoring apparatus 15 includes display devices such as a display, a lamp, and the like used for displaying the operation state of each plant 15. The operation monitoring apparatus 12 may display a plurality of windows on one or a plurality of displays and display the operation state of each plant 15. As indicators of the operation state, for example, measured values output from sensors 16A and 16B are displayed. The operation monitoring apparatus 12 controls the operation of each control apparatus 14 in accordance with a direction according to an operation input.

Each control apparatus 14 is connected to a field network NW1F and controls the operation state of each plant 15 under the monitoring from the operation monitoring apparatus 12. The control apparatus 14 executes a program installed by the engineering apparatus 10 by using set parameters. In the example shown in FIG. 1, measured values are input to the control apparatuses 14A and 14B from the sensors 16A and 16B, respectively, through the field network NW1F. The control apparatuses 14A and 14B acquire operation amounts by performing predetermined operation control on the basis of the input measured values and output the acquired operation amounts to actuators 18A and 18B, respectively, through the field network NW1F.

The plants 15A and 15B are plants realizing industrial processes. In the plant 15A, the sensor 16A and the actuator 18A are installed as field devices. The sensor 16A measures a physical quantity representing the operation state of the plant 15A and inputs the measured value to the control apparatus 14A. The actuator 18A operates the operation state of the plant 15A on the basis of an operation amount output from the control apparatus 14A. Accordingly, one control loop is formed by the sensor 16A, the control apparatus 14A, and the actuator 18A.

In the plant 15B, the sensor 16B and the actuator 18B are installed as field devices. The sensor 16B measures a physical quantity representing the operation state of the plant 15B and inputs the measured value to the control apparatus 14B. The actuator 18B operates the operation state of the plant 15B on the basis of an operation amount output from the control apparatus 14B. Accordingly, one control loop is formed by the sensor 16B, the control apparatus 14B, and the actuator 18B.

For example, each of the sensors 16A and 16B is a flowmeter, a temperature sensor, a pressure sensor, or the like. For example, each of the actuators 18A and 18B is a flow rate control valve, an on-off valve, a motor, a pump, or the like.

In the example shown in FIG. 1, although the numbers of input and output channels of each of the plants 15A and 15B are one-input one-output, the numbers of input and output channels of a plant are generally different depending on the plant. There are also cases in which each of the numbers of input channels/output channels is two or more.

The replicated control system 2 is a replicated control system that is installed independently from the control apparatuses 14A and 14B controlling the plants 15A and 15B and is replicated mainly for executing engineering of the control apparatuses 14A and 14B. More specifically, the replicated control system 2 is a process control system which includes an engineering apparatus 20, an operation monitoring apparatus 22, a control apparatus 24A, and a control apparatus 24B. The engineering apparatus 20, the operation monitoring apparatus 22, the control apparatus 24A, and the control apparatus 24B have configurations similar to those of the engineering apparatus 10, the operation monitoring apparatus 12, the control apparatus 14A, and the control apparatus 14B, respectively. In the replicated control system 2, each of the control apparatus 24A and the control apparatus 24B described above does not need to be an actual apparatus but may be a simulator capable of simulating the operation of the control apparatus or a device such as an arithmetic operation device, a personal computer, or a terminal device in which a simulation model capable of simulating the operation is built. The engineering apparatus 20, the operation monitoring apparatus 22, the control apparatus 24A, and the control apparatus 24B are connected to a control network NW2 and transmit or receive various kinds of data through the control network NW2 in a wired or wireless manner. For example, a sensor 26A measuring a physical quantity indicating the operation state of a plant 25A (not shown in the drawing) and an actuator 28A operating the plant 25A are connected to the control apparatus 24A. A sensor 26B measuring a physical quantity of the operation state of a plant 25B (not shown in the drawing) and an actuator 28B operating the plant 25B are connected to the control apparatus 24B.

The replicated control system 2 may be an in-company control system disposed outside the plant. The "in-company" is one example of a place at which engineering work of a data file used in the on-site control system 1 is executed and merely represents being present inside an office of an operator (inside a company) managing the on-site control system 1.

Each of the plants 25A and 25B has a configuration similar to that of each of the plants 15A and 15B. For example, when an operation amount output to the actuator 28A is the same as an operation amount output to the actuator 18A, the amount of measurement input from the sensor 26A is the same as the amount of measurement input from the sensor 16A. The replicated control system 2 may include simulators (not shown in the drawing) used for simulating the input and output characteristics of the plants 15A and 15B instead of the plants 25A and 25B.

A program and parameters operated in the engineering are generally stored in a plurality of data files. FIG. 1 illustrates File A to File F as examples of data files relating to the control apparatus 14A. The engineering apparatus 10 may output a data file relating to each control apparatus to an external memory such as a flash memory or a hard disk drive (HDD) or may transmit the data file to the engineering apparatus 20 of the replicated control system 2 through an information network (not shown in the drawing) that is separate from a control network. The control apparatuses 24A and 24B have configurations similar to the control apparatuses 14A and 14B, respectively. For this reason, the engineering of the control apparatuses 14A and 14B can be executed in the engineering apparatus 20. Control apparatuses that are targets for the engineering operations of the engineering apparatus 20 do not need to be actual apparatuses, in other words, the control apparatuses 14A and 14B may be simulators capable of simulating the operations of the control apparatuses 14A and 14B or devices such as arithmetic operation devices, personal computers, or terminal devices in which simulation models capable of simulating the operations are built. The engineering apparatus 20 provides data files edited through engineering for the engineering apparatus 10 through an external memory or an information network. In the example shown in FIG. 1, data files provided from the engineering apparatus 20 for the engineering apparatus 10 are File A', File B, File C', File D', File E, and File F. File A', File C', and File D' represent that a part or all of the stored information is changed from File A, File C, and File D through engineering.

(Engineering Apparatus)

Next, the functional configuration of the engineering apparatus 10 according to this embodiment will be described.

Figure 2:
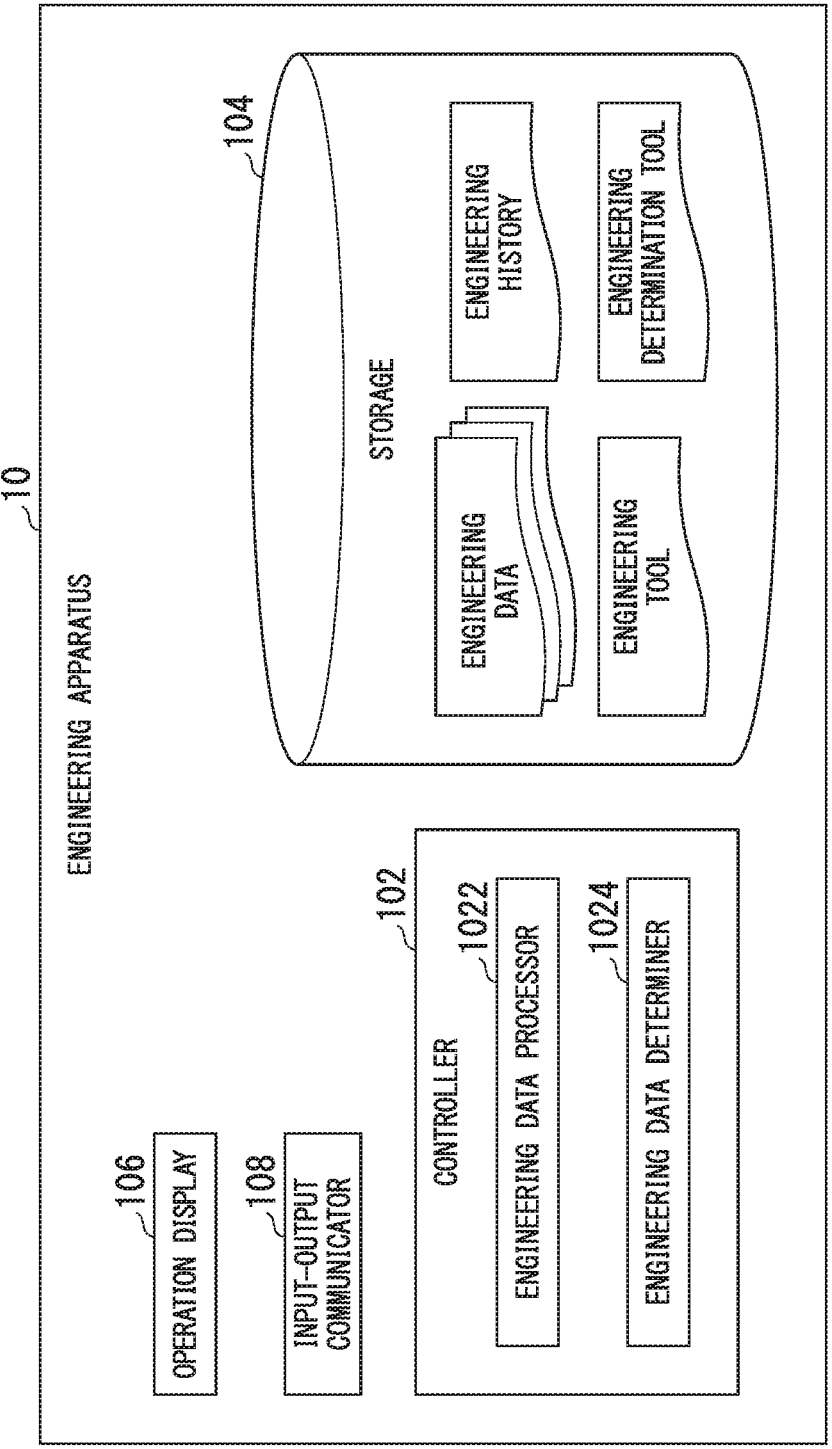
FIG. 2 is a block diagram showing one example of the functional configuration of an engineering apparatus according to this embodiment.

FIG. 2 is a block diagram showing one example of the functional configuration of the engineering apparatus 10 according to this embodiment. The functional configuration of the engineering apparatus 20 is similar to the functional configuration of the engineering apparatus 10, and thus description thereof can be referred to.

The engineering apparatus 10 includes a controller 102, a storage 104, an operation display 106, and an input and output communicator 108.

The controller 102 includes an engineering data processor 1022 and an engineering data determiner 1024. The controller 102 is configured by a control device such as a central processing unit (CPU). The control device reads a program of an engineering tool stored in the storage 104 in advance and executes the read program, thereby functioning as the engineering data processor 1022. The control device reads a program of an engineering tool stored in the storage 104 in advance and executes the read program, thereby functioning as the engineering data determiner 1024.

The engineering data processor 1022 executes a process relating to engineering for engineering data used in the operation of the control apparatus 14. The engineering data processor 1022 executes editing of the engineering data, an operation test of engineering data, and output (transition or reflection) to the control apparatus 14 that has been directed in accordance with a direction of an operation signal input from the input and output communicator 108. In the editing of the engineering data, preparation, change, and deletion of a part or all of the engineering data stored in the storage 104 in advance are included. The engineering data processor 1022 stores a data file group storing engineering data acquired through editing in the storage 104.

The engineering data is mainly classified into an application program executed by each control apparatus 14 and an input and output setting (I/O) of a field device installed in the plant 15 that is a control target. In an application program, information representing one or a plurality of functional blocks used for executing operation control is described. In other words, described functional blocks are constituent elements of a control logic. As functional blocks, for example, processes corresponding to the occurrence of an event or an operation state such as PIC control or various types of logic control are built. The operation control is executed for each control loop. A control logic used for executing the operation control is described in each data file. In the following description, a data file in which this control logic is described may be referred to as an application module. In an application module, parameters used in the process, an input and output path (connection) and the like are described as information relating to each functional block. As the input and output setting, parameters relating to a field device are described. As the parameters to be described, for example, information such as a type of field device and an installation position is set. In the following description, a data file in which this input and output setting is described may be referred to as an input and output setting file. The application module and the input and output setting file may be formed for each control loop or may be formed for each combination of a plurality of predetermined control loops.

The engineering data processor 1022 executes an operation test on the basis of the engineering data. An operation test represents a process for checking the operation of the replicated control system 2 after the transition or reflection of data to reduce errors in an engineering operation such as transition or reflection of the engineering data. The engineering data processor 1022, for example, executes the following process in an operation test.

Determination of whether or not content described in each data file is described in a predetermined form Execution of an application program synchronized with a measured value input from the sensor 16A or the like Display of a measured value or an operation amount acquired by executing an application program on the operation display 106

Loop check of field device through each control apparatus 14

The engineering data processor 1022 outputs engineering data relating to a control apparatus directed according to an operation signal to the control apparatus. The engineering data processor 1022 may convert engineering data from a data form (for example, a text form) in which a person can visually recognize engineering data into binary data of a binary form. The control apparatus may include a device that converts a data form from data in the text form into data in the binary form that is needed for the control device. The engineering data processor 1022 integrates binary data acquired through the conversion and outputs the integrated data to the control apparatus through the input and output communicator 108. The control apparatus installs the engineering data input from the engineering apparatus 10.

The engineering data processor 1022 inputs (imports) a data file group storing engineering data relating to a certain control apparatus.

The engineering data processor 1022 outputs (exports) a data file group storing engineering data relating to a control apparatus designated according to an operation signal among engineering data stored in the storage 104. An input or output target may be a storage medium (memory) that is physically connected to its own apparatus to be detachable and may be the engineering apparatus 20 of the replicated control system 2 connected though an information network.

The engineering data processor 1022 may store history information representing a process (event) that is executed and a start time of the process in the storage 104 for each process, thereby forming an engineering history. In the history information, for example, in a case in which an event is a change in a data file, information of the data file that is a processing target and information of the data file before and after the change are included. The engineering history may be formed by accumulating history information in order of start time. The engineering history may be formed for each control apparatus.

The engineering data determiner 1024 determines information of the occurrence of a change according to engineering in units of data files for each piece of engineering data stored in the data file group, which is input to the engineering data processor 1022, and each piece of engineering data stored in the storage 104. A data file group storing the engineering data stored in the storage 104 will be referred to as a first data file group. A data file group input to the engineering data processor 1022 will be referred to as a second data file group. The second data file group may be input from the outside of the engineering apparatus 10 through an electronic recording medium or a network. The engineering data determiner 1024 acquires a data file storing information changed by the engineering data processor 1022 of its own apparatus among data files included in the first data file group relating to a specific control apparatus and a data file storing information changed by the engineering data processor of the engineering apparatus 20 among data files included in the second data file group relating to the control apparatus as differential files. By referring to the engineering history, the engineering data determiner 1024 can specify a time point at which editing of a data file belonging to the first data file group is started by the engineering data processor 1022 as a time point at which engineering for the first data file group is started. For example, by referring to the engineering history stored in the storage 104, the engineering data determiner 1024 may specify a time point at which the first data file group is directly or indirectly output to the engineering apparatus 20 from the engineering apparatus 10 as a time point at which engineering for the second data file group is started. Furthermore, the engineering data determiner 1024 may specify a differential file included in the second data file group by referring to the engineering history that is directly or indirectly input from the engineering apparatus 20.

The engineering data determiner 1024 aggregates a data file not including information changed also in accordance with the engineering data processor 1022 (hereinafter referred to as an unchanged file) among the data files belonging to the first data file group of a certain control apparatus 14 and the acquired differential file as a new data file group (hereinafter referred to as an updated file group) relating to the control apparatus. Then, the engineering data determiner 1024 determines whether information stored in a data file in the update file group is mismatched.

As the mismatching of a determination target, for example, there are mismatching of a functional block relating to the control apparatus, mismatching of an input and output path between functional blocks, mismatching of an input and output setting set in the control loop, and the like.

The engineering data determiner 1024 may display information determined to be mismatched on the operation display 106 or further display a reason for the mismatching on the operation display 106.

When it is determined that there is no mismatching, the engineering data determiner 1024 stores checking information representing the indication thereof and the update file group in the storage 104 in association with each other. Accordingly, the original first data file group is updated with the update file group.

The engineering data processor 1022 sets the engineering data stored in the data file group stored in association with the checking information to be installable on the control apparatus. In other words, even in the case of being directed in accordance with an input operation signal, the engineering data processor 1022 does not reflect (transition, output, or the like) engineering data stored in the data file group not stored in association with the checking information.

The operation display 106 includes an operation input that receives a user's operation and outputs an operation signal corresponding to the operation to the controller 102. The operation input, for example, is a pointing device such as a mouse, a keyboard, or a touch sensor. The operation display 106 includes a display that displays various kinds of information input from the controller 102. The display, for example, is a display device such as a liquid crystal display or a display panel. The operation input and the display may be separate units or may be configured as an integrated touch panel.

The input and output communicator 108 includes an input and output that receives various kinds of data from the outside of the engineering apparatus 10 and outputs various kinds of data input from the controller 102 to the outside of the engineering apparatus. The input and output, for example, is an input and output interface. The input and output communicator 108 includes a communicator that transmits/receives various kinds of data to/from a device connected to the control network NW1 in a wired or wireless manner. The communicator, for example, is a communication interface.

(Example of Differential File)

There is a possibility of the engineering of the control apparatus installed in the on-site control system 1 also being executed in both the engineering apparatus 10 of the on-site control system 1 and the engineering apparatus 20 of the replicated control system 2. For example, files File A to File F (before correction) relating to the control apparatus 14A of the on-site control system 1 may be changed independently in the on-site control system 1 and the replicated control system 2. For this reason, changed places may be different between the systems. In the example shown in FIG. 3, while data files of which information has been changed by the engineering apparatus 20 are File A', File C', and File D', a data file of which information has been changed by the engineering apparatus 10 is File B'. Thus, by referring to the engineering history, the engineering data determiner 1024 of the engineering apparatus 10 specifies the data file File B' including information changed from the original file File B before correction among the first data file group at the time point and the original data file File B.

The engineering data determiner 1024 determines that the other files File A, File C, File D, File E, and File F have not been changed. Then, the engineering data determiner 1024 specifies File A', File C', and File D' including information changed from the information before correction, in other words, the information at the time point of output among the second data file group taken in from the engineering apparatus 20. The engineering apparatus 10 updates File A, File C, and File D included in the first data file group with the specified File A', File C', and File D'. Such files are targets for detecting the presence/absence of mismatching. The detection of presence/absence of mismatching is executed before the reflection thereof on the control apparatus 14.

Figure 3:
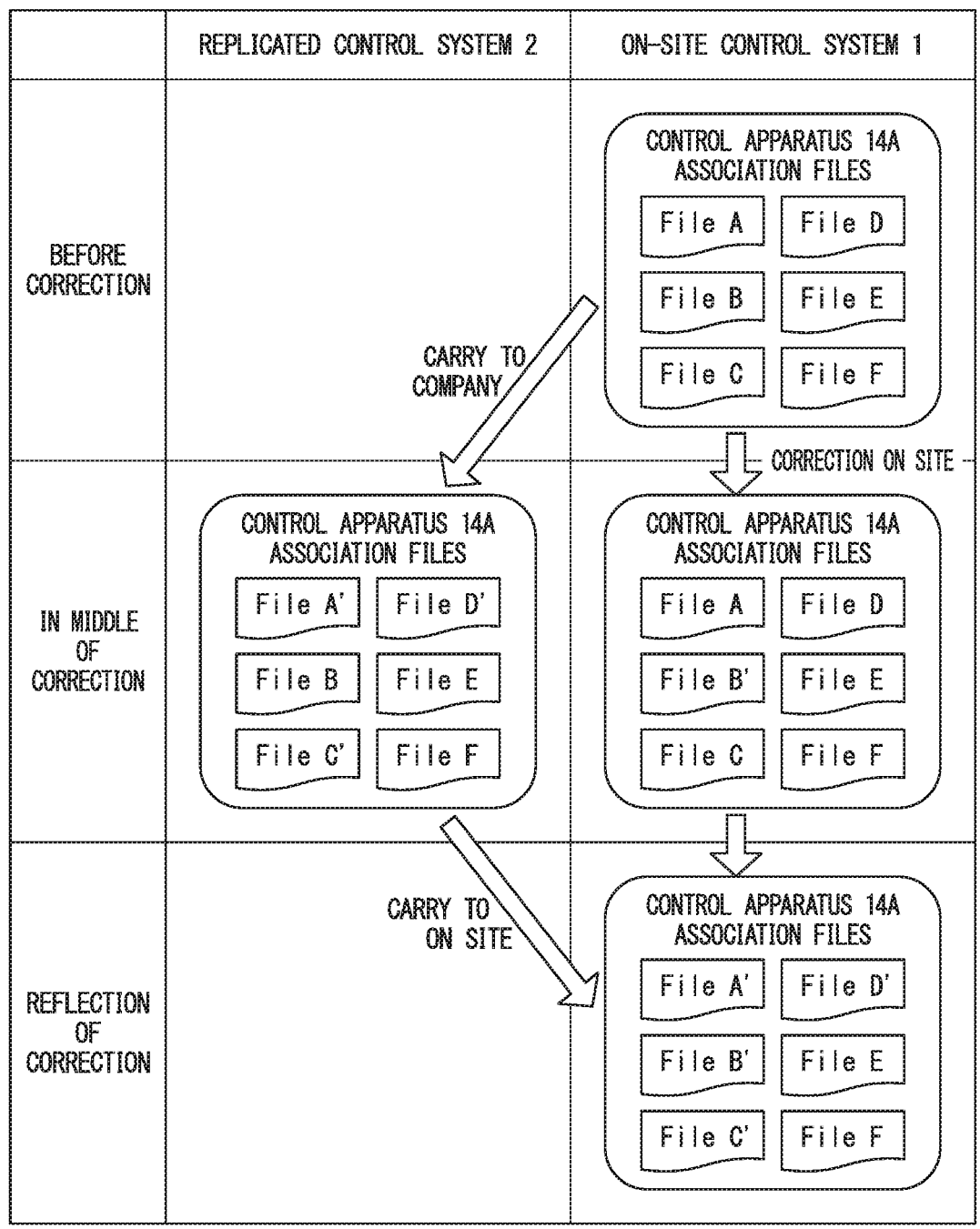
FIG. 3 is a diagram showing one example of changes in engineering data according to engineering.

In the example shown in FIG. 3, data files of which information has been changed are File A', File C', and File D' in the second data file group, and a data file of which information has been changed is File B' in the first data file group, whereby there is no overlapping in the changed files. However, there are cases in which a data file including information changed from information included in a common data file before a common change is present in the first data file group and the second data file group. For example, other than File B' of the second data file group, there is a case in which File B" storing information changed from the information included in the original File B is included in the first data file group. In such a case, the engineering data determiner 1024 may display inquiry information representing selection of one of two data files including information changed from the common original data file, in other words, File B' and File B", on the operation display 106. Then, the engineering data determiner 1024 selects one data file included in one data file group, in other words, one data file out of File B' and File B", on the basis of an operation signal input from the operation display 106.

In a case in which data files of which information has been changed overlap each other, a data file included in one of the first data file group and the second data file group to be selected with priority by the engineering data determiner 1024 may be set in advance. The engineering data determiner 1024 selects one of data files overlapping each other on the basis of the setting.

The engineering data determiner 1024 may display information changed from the original information and the position thereof in the data file included in the first data file group on the operation display 106 (differential display function). Then, the engineering data determiner 1024 may display an inquiry of import of a data file storing the information on the operation display 106 and select the data file in accordance with a direction of import using an operation signal (a change point selection function).

(Determination of Matching)

Figure 4:
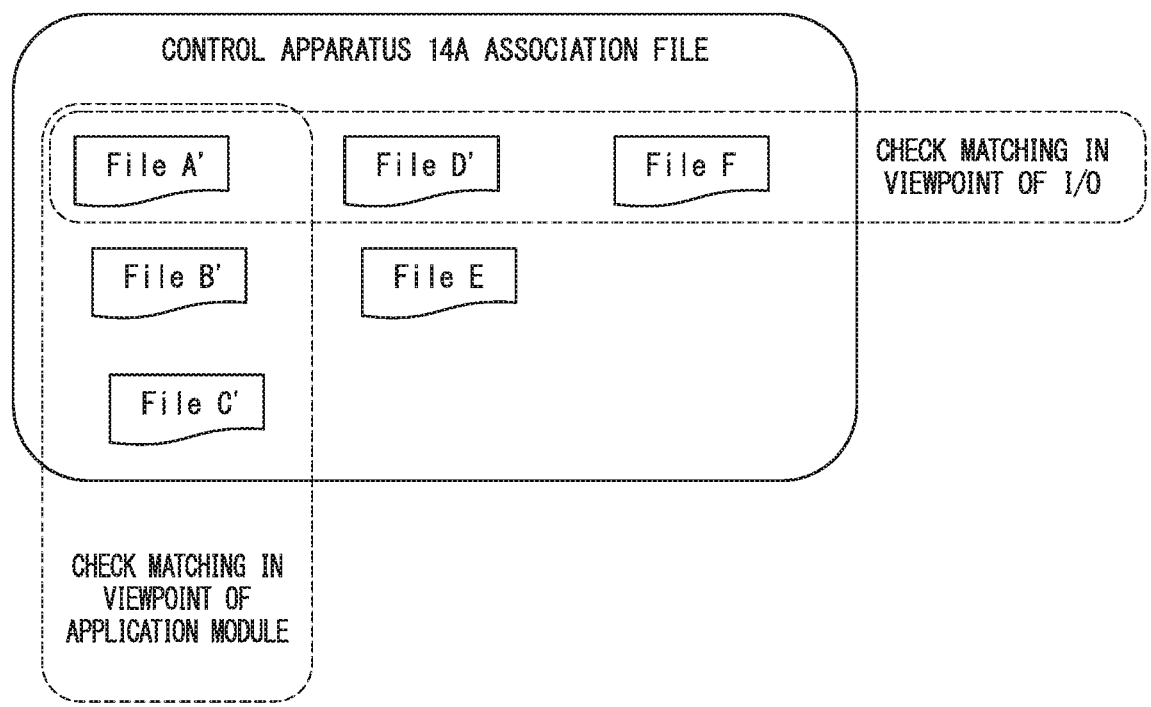
FIG. 4 is a conceptual diagram showing an example of a viewpoint of matching of engineering data according to this embodiment.
Figure 5:
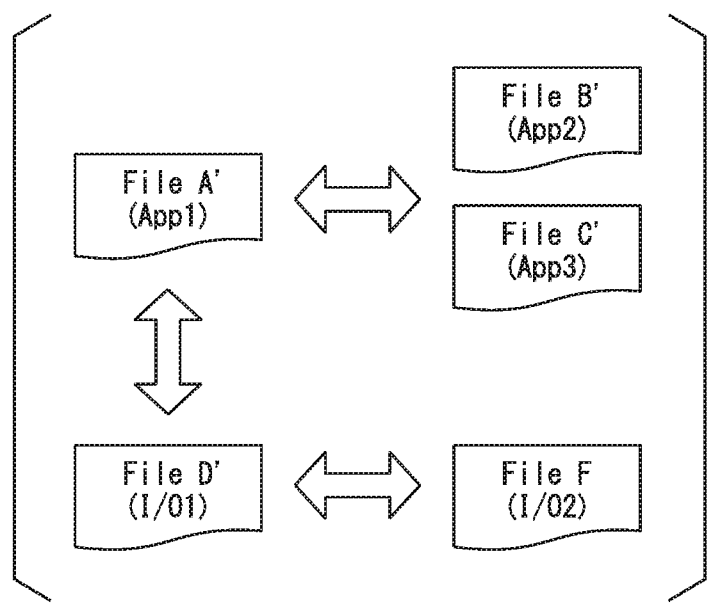
FIG. 5 is a conceptual diagram showing an example of a determination target of matching of engineering data according to this embodiment.

As determination of the presence/absence of mismatching, mainly, there are determination in the viewpoint an application module and determination in the viewpoint of input and output (I/O). The determination in the viewpoint of an application module represents determination of presence/absence of mismatching between functional blocks configuring the application module. In the examples shown in FIGS. 4 and 5, mismatching among File A' (App1), File B' (App2), and File C' (App3) that are application modules is determined. In the determination of the viewpoint of input and output, determination of presence/absence of mismatching between input and output setting files and determination of presence/absence of mismatching between an application module and input and output setting file are included. In the examples shown in FIGS. 4 and 5, mismatching is determined between File A' (App1) that is an application module and File D' (I/O1) that is an input and output setting file relating to this application module and between File D' (I/O1) and File F(I/O2) that are input and output setting files. Examples of determination items of matching will be described later.

(Control Apparatus)

Figure 6:
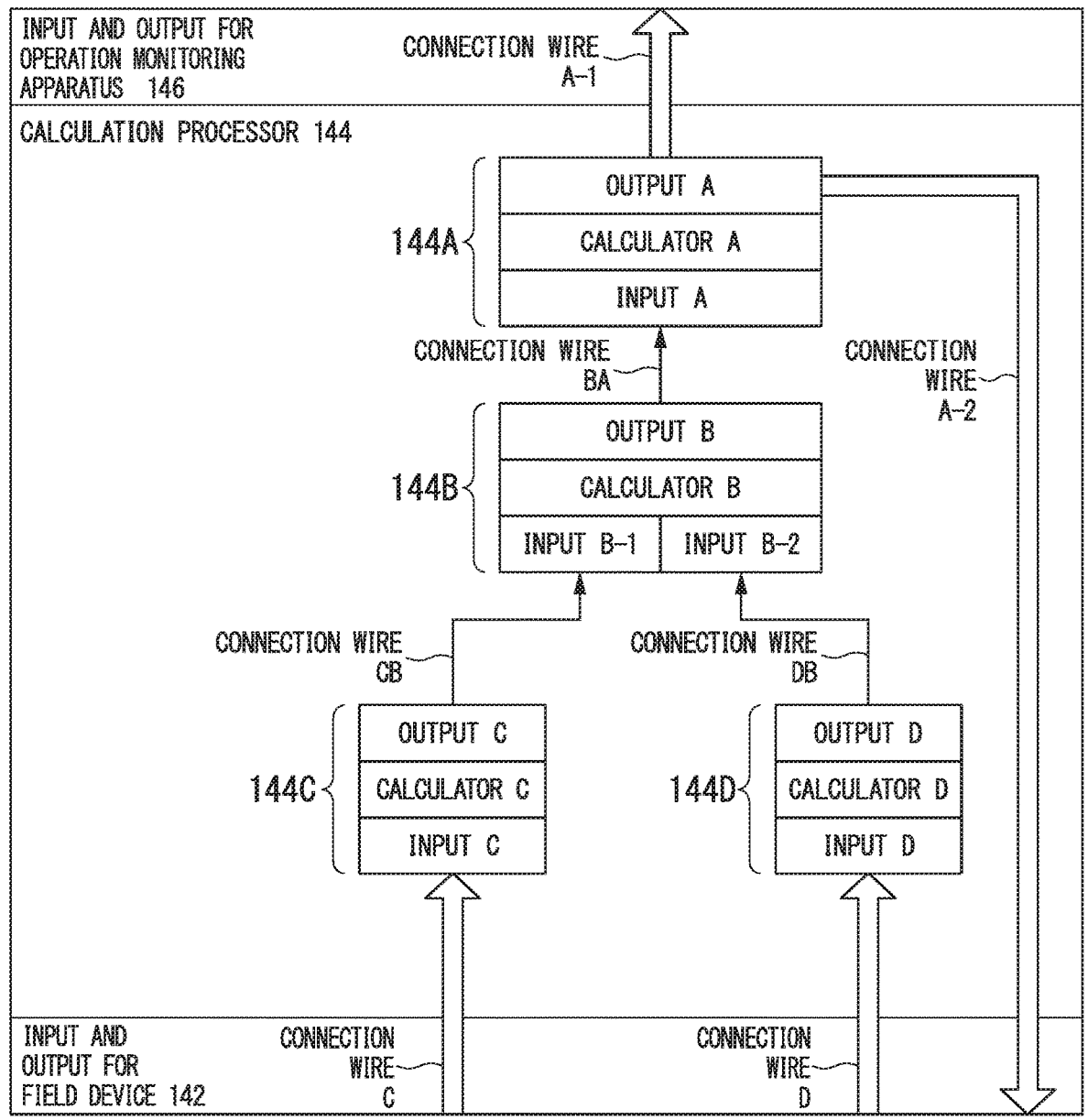
FIG. 6 is a block diagram showing one example of the functional configuration of a control apparatus according to this embodiment.

Next, one example of the functional configuration of the control apparatus 14 according to this embodiment will be described. In the following description, a case in which the control apparatus 14 realizes two-input one-output control in which input data of two channels is input from the plant 15, and output data of one channel is output will be described as an example. FIG. 6 is a block diagram showing one example of the functional configuration of the control apparatus 14 according to this embodiment.

The control apparatus 14 includes an input and output 142 used for a field device, a calculation processor 144, and an input and output 146 used for an operation monitoring apparatus.

The input and output 142 is connected to the field network NW1F and transmits/receives various kinds of data to/from a field device. The input and output 142 outputs a measured value input from a sensor to the calculation processor 144. The input and output 142 outputs an operation amount output from the calculation processor 144 to an actuator. The input and output 142 includes an input and output interface and is connected to a node in which one or a plurality of I/O cards are installed. Each I/O card functions as one unit, and a slot of the I/O card used for mediating an input to the calculation processor 144 and an output from the calculation processor 144 is directed in accordance with an input and output setting for each input and output channel that is stored in an input and output setting file provided from the engineering data processor 1022.

The calculation processor 144 includes one or a plurality of functional blocks. Each functional block includes an input, a calculator, and an output. Input information is input to the input from one of the input and output 142, another functional block, and the input and output 146 or a combination thereof as input sources. The calculator performs an arithmetic operation process for input information input to the input, thereby generating output information. The output outputs the output information generated by the calculator to one of the input and output 142, another functional block, and the input and output 146 or a combination thereof as output targets.

The calculation processor 144 includes a control device such as a CPU, and the control device executes a control logic described in the application module provided from the engineering data processor 1022 to realize the function of the functional block. The control logic is configured by such functional blocks and input and output path connection wires between the input and output 142 and the functional blocks, between the functional blocks and input and output 146, and between the functional blocks. As types of functional blocks, there are a control functional block and an input and output functional block. The control functional block is a functional block having a function of execution of control operations such as sequence control and continuous control. An input of the control function block sets output information output from another functional block as input information of its own block. An output of the control function block outputs output information generated by its own block to another functional block. The input and output functional block is a functional block including: an input to which input information is input from one or both of the input and output 142 and the input and output 146; or an output that outputs output information to one or both of the input and output 142 and the input and output 146.

In the example shown in FIG. 6, the calculation processor 144 includes four functional blocks 144A to 144D. Input information is input from the input and output 142 to the input C of the functional block 144C through a connection wire C. Input information is input from the input and output 142 to an input D of the functional block 144D through a connection wire D. Output information from an output C of the functional block 144C is input to an input B-1 of the functional block 144B through a connection wire CB as input information for the input B-1. Output information is input from an output D of the functional block 144D to an input B-2 of the functional block 144B through a connection wire DB as input information for the input B-2. Output information is input from an output of the functional block 144B to an input A of the functional block 144A through a connection wire BA as input information for the input A. An output A of the functional block 144A outputs the output information generated by the calculator A to the input and output 146 through a connection wire A-1 and to the input and output 142 through a connection wire A-2.

The input and output 146 is connected to a control network NW1 and transmits/receives various kinds of data to/from the operation monitoring apparatus 12 or the engineering apparatus 10. The input and output 146 includes, for example, an input and output interface. The input and output 146 outputs output information output from the calculation processor 144 to the operation monitoring apparatus 12. The output information that is output, for example, is information representing an operation amount calculated by the functional block 144B or the tendency of the change thereof.

(Editing of Engineering Data)

When engineering data is edited in accordance with a direction of an operation signal, the engineering data processor 1022 displays information represented by the engineering data on the operation display 106. An engineer visually recognizes the displayed information to ascertain information set as engineering data.

For example, the engineering data processor 1022, as shown in FIG. 6, displays (draws) functional blocks of control logics to be executed by the control apparatus 14A, connection wires between the functional blocks, and connection wires between the functional blocks and the input and output 142 or the input and output 146 by using graphics. In the following description, this display screen will be referred to as an editor screen. The engineering data processor 1022 sets such functional blocks, the connection wires, parameters, and the other information in accordance with a direction of an operation signal. The information of the control logic is formed for each control loop.

However, the information of a control logic described in an application module is converted into binary data and then is output to the control apparatus 14A. In the binary data, each constituent element of a control logic is represented in a bit stream of bits each formed from a value of 0 or 1. For example, the input A of the functional block 144A and the output B of the functional block 144B are represented as "010101" and "100101," respectively. The connection wire BA between functional blocks is defined with the input A and the output B. For this reason, binary data representing each constituent element needs to be data representing unique information that is specific to the constituent element. This means that the name of each constituent element is unique, and it is not allowed for names of a plurality of constituent elements to overlap each other, in other words, to be a common name.

When the engineering data processor 1022 sets the connection wire BA connecting the input A and the output B on the basis of an operation signal, it is necessary for the connection wire BA not to overlap other connection wires connecting other functional blocks to the input A and the output and other connection wires connecting the input A and the output B. This is because, as a function realized by control logics, organic connection relations of such a function are defined using described functional blocks and connection wires between the functional blocks.

In a case in which a connection wire BA between the input A of the functional block 144A and the output B of the functional block 144B is not set and is missing, input information is not provided for the functional block 144A, and accordingly, the functional block 144A does not exhibit the function. For this reason, control directed in accordance with the set control logic is not achieved.

In the calculation processor 144, as functional blocks to be originally included, at least an input and output functional block inputting input information from the input and output 142 and an input and output functional block outputting output information to the input and output 142 need to be included. When a functional control block is set instead of the input and output functional block, the functional control block does not exhibit the function. For this reason, according to the missing of a functional block having an appropriate function, the setting of a functional block having an inappropriate function, and a connection to such a functional block, control directed in accordance with a set control logic is not established.

Thus, the engineering data determiner 1024 performs determinations (A1) to (A4) to be described next as determinations in the viewpoint of an application module for an application module belonging to an update file group formed by an unchanged file and a differential file. In a case in which all the results of the determinations (A1) to (A4) are "none," the engineering data determiner 1024 determines that there is no mismatching in the viewpoint of the application module.

(A1) Whether or not there is overlapping between names of functional blocks described in an application module and input and output paths More specifically, when a plurality of functional blocks having a common name are included in such an application module, the engineering data determiner 1024 determines that there is overlapping between the names of the functional blocks. On the other hand, when there is no plurality of functional blocks having a common name, the engineering data determiner 1024 determines that there is no overlapping between the names of the functional blocks. When a plurality of input and output paths having a common name are included in such an application module, the engineering data determiner 1024 determines that there is overlapping between the names of the input and output paths. On the other hand, when there is no plurality of input and output paths having a common name, the engineering data determiner 1024 determines that there is no overlapping between the input and output paths.

(A2) Whether or not there is overlapping between one side of functional blocks of input sources designated in an input and output path and functional blocks of output targets or both sides thereof as arrangement of connection wires More specifically, when input and output paths designating two or more functional blocks are included in one of an input source and an output source or both thereof in such an application module, the engineering data determiner 1024 determines that there is overlapping in one side of functional blocks of input sources designated in the input and output path and functional blocks of output targets or both sides thereof. On the other hand, when there are no input and output paths designating two or more functional blocks in one of an input source and an output source or in either thereof in such an application module, the engineering data determiner 1024 determines that there is no overlapping in one side of functional blocks of input sources designated in the input and output path and functional blocks of output targets or both sides thereof.

(A3) Whether or not there is a missing input and output path of an input source or an output target designated in input and output paths between functional blocks, in other words, there is an input and output path of which an input or output connection target is not defined More specifically, when there is an input and output path in which another functional block, the input and output 142, or the input and output 146 is not designated in one of the input source and the output target or both thereof in such an application module, the engineering data determiner 1024 determines that there is an input and output path of which the input source or the output target is missing. On the other hand, when there is no input and output path in which another functional block, the input and output 142, or the input and output 146 is not designated in one of the input source and the output target or either thereof in such an application module, the engineering data determiner 1024 determines that there is no input and output path of which the input source or the output target is missing.

(A4) Whether or not there is a functional block of a predetermined kind that cannot be combined in input or output connection targets designated in the input and output path More specifically, in an input and output path in which the input and output 142 or the input and output 146 is designated as an input target or an output source, when an input and output functional block is designated as the output source or the input target, the engineering data determiner 1024 determines the input and output functional block as a functional block of a kind that can be combined. On the other hand, in an input and output path, when a control functional block is designated as the output source or the input target, the engineering data determiner 1024 determines the control functional block as a functional block of a kind that cannot be combined.

The information of the input and output setting described in the input and output setting file is also converted into binary data and then output to the control apparatus 14A and is used for designating a field device that becomes an input and output target from the control apparatus 14A. In a case in which the input and output setting of a field device is missing, a field device that becomes an input and output target cannot be specified, and a plant that is a control target is not specified. In a case in which the input and output setting is missing, for example, there are a case in which there is no input and output setting relating to the input of data or the output of generated data requested by an input and output functional block, a case in which there is no field device connected to an installation position (for example, a slot) designated in the input and output setting, and the like.

In addition, there is a case in which there are a plurality of I/O cards that can be used for inputting/outputting data from/to a common control loop at different installation positions in accordance with a multiplexing setting. In such a case, there is concern that an installation position designated in the input and output setting of a control loop of interest overlaps the installation position designated in the input and output setting of another control loop, in other words, an installation position designated in the input and output setting of a certain control loop, is common to an installation position designated in the input and output setting of another control loop.

Even in a case in which there is no overlapping or missing at an installation position designated in the input and output setting, in a case in which the type (for example, a sensor, an actuator, or the like) of a connected field device does not match the type (for example, input information representing a measured value or an output amount representing an operation amount) of data input or output by an input and output functional block configuring a control loop through the input and output 142, data requested from the input and output functional block cannot be acquired, or generated data is not provided.

Thus, the engineering data determiner 1024 performs the following determinations (B1) to (B3) as determinations in the viewpoint of input and output for input and output data belonging to an update file group formed by an unchanged file and a differential file and an application module.

In a case in which the results of all the determinations (B1) to (B3) are "none," the engineering data determiner 1024 determines that there is no mismatching in the viewpoint of input and output.

(B1) Whether or not there is missing in an input and output setting corresponding to input and output between an input and output functional block described in an application module and the input and output 142

More specifically, when a plurality of input and output settings corresponding to an input and output path designating the input and output 142 as an input source or an output target are described in an input and output setting file in such an application module, the engineering data determiner 1024 determines that there is overlapping in the input and output settings. On the other hand, when an input and output setting corresponding to an input and output path designating the input and output 142 as an input source or an output target is not described in an input and output setting file in such an application module, the engineering data determiner 1024 determines that there is missing in the input and output setting. In addition, when one input and output setting corresponding to an input and output path designating the input and output 142 as an input source or an output target is described in an input and output setting file in such an application module, the engineering data determiner 1024 determines that there is neither overlapping nor missing in the input and output setting.

(B2) Whether or not there are overlapping installation positions designated in an input and output setting described in an input and output setting file More specifically, when there are a plurality of input and output settings in which designating installation positions are common in such an input and output setting file, the engineering data determiner 1024 determines that there are overlapping installation positions. On the other hand, when installation positions designated in the input and output setting are different from each other in such an input and output setting file, the engineering data determiner 1024 determines that there is no overlapping installation positions.

(B3) Whether or not there is an input and output setting not matching the type of field device designated in an input and output setting and the type of data input and output from/to an input and output functional block More specifically, an input and output data table representing the type of a corresponding field device for each type of input data or output data is stored in the storage 104 in advance. For example, in a case in which the type of measured value that is input data is temperature, the type of a corresponding field device is a temperature sensor. In a case in which the type of an operation amount that is output data is the number of revolutions, the type of a corresponding field device is a motor. The engineering data determiner 1024, by referring to the input and output data table, specifies the type of field device corresponding to the type of a field device designated for each input and output setting described in the input and output setting file. Then, in a case in which the specified type of field device does not match the type of data that is input and output to/from the input and output 142 through an input and output path corresponding to the input and output setting, the engineering data determiner 1024 determines that the type of input and output data does not match the type of field device. On the other hand, in a case in which the specified type of field device matches the type of input or output data corresponding to the input and output setting, the engineering data determiner 1024 determines that the type of input and output data matches the type of field device.

When it is determined that there is no mismatching in both the viewpoint of an application module and the viewpoint of input and output, the engineering data determiner 1024 stores checking information and an update file group in the storage 104 in association with each other.

In a case in which an input and output setting file is not included in an update file, the engineering data determiner 1024 may not perform the determination in the viewpoint of input and output, in other words, the determinations (B1) to (B3).

(Engineering Method)

Next, an engineering method according to this embodiment will be described.

Figure 7:
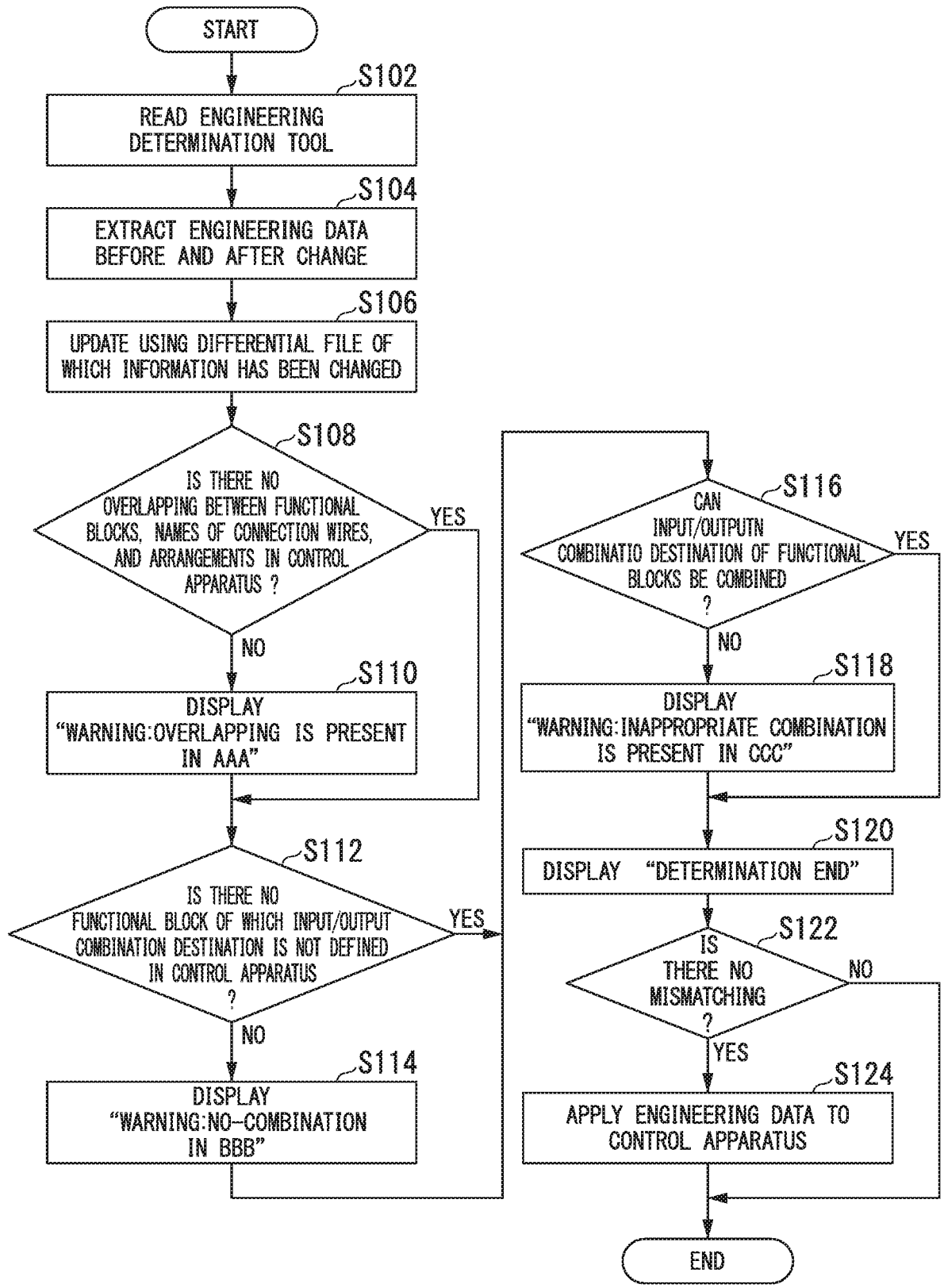
FIG. 7 is a flowchart showing one example of an engineering method according to this embodiment.

FIG. 7 is a flowchart showing one example of the engineering method according to this embodiment.

(Step S102) The controller 102 reads a program of an engineering tool from the storage 104, starts the execution of a read program, and starts the operation of the engineering data determiner 1024. Thereafter, the process proceeds to the process of Step S104.

(Step S104) The engineering data determiner 1024 specifies information before and after change for each of the first data file group storing engineering data maintained in its own apparatus and the second data file group storing engineering data input to the engineering data processor 1022 by referring to the engineering history. The engineering data determiner 1024 specifies a data file storing the changed information as a differential file and specifies a data file of which information has not been changed as an unchanged file. Thereafter, the process proceeds to the process of Step S106.

(Step S106) The engineering data determiner 1024 forms an update file group by aggregating the differential file and the unchanged file. In this way, the original data file storing the information before change is updated with the differential file in which the information after change is stored. Thereafter, the process proceeds to the process of Step S108.

(Step S108) The engineering data determiner 1024 determines whether or not there are overlapping functional blocks, overlapping names of connection wires, and overlapping arrangements of connection wires for an application module of the control apparatus that is an engineering target. This determination corresponds to the determinations A1 and A2 described above. In a case in which it is determined that there is no overlapping (Step S108: Yes), the process proceeds to the process of Step S112. On the other hand, in a case in which it is determined that there is overlapping (Step S108: No), the process proceeds to Step S110.

(Step S110) The engineering data determiner 1024 generates a predetermined warning message representing detection of overlapping and outputs the generated warning message to the operation display 106 to be displayed on the operation display 106. In the warning message, information of parts in which overlapping is detected, in other words, the functional block, the name of the connection wire, the name of the arrangement of the connection wire, and the like is included. The warning message, for example, includes a text string of "Warning: there is overlapping in AAA." The engineering data determiner 1024 may display a corresponding functional block and the position of the connection wire on an editor screen. The engineering data determiner 1024 may store the warning message in the storage 104 to be accumulated as a part of a warning log. Thereafter, the process proceeds to Step S112.

(Step S112) The engineering data determiner 1024 determines whether or not a functional block of which the input or output connection target is not defined is present for an application module of the control apparatus that is an engineering target. This determination corresponds to the determination A3 described above. In a case in which the input or output connection target is not defined (Step S112: Yes), the process proceeds to the process of Step S116. On the other hand, in a case in which it is determined that a functional block of which the input or output connection target is not defined is present (Step S112: No), the process proceeds to the process of Step S114.

(Step S114) The engineering data determiner 1024 generates a predetermined warning message representing the detection of a functional block of which the input or output connection target is not defined and outputs the generated warning message to the operation display 106 to be displayed on the operation display 106. In the warning message, information of the name or the like of a functional block of which the input or output connection target is not defined is included. The warning message, for example, includes a text string of "Warning: there is no combining in BBB." The engineering data determiner 1024 may display the position of the corresponding functional block on the editor screen. The engineering data determiner 1024 may store the warning message in the storage 104 and is accumulated as a part of a warning log. Thereafter, the process proceeds to Step S116.

(Step S116) The engineering data determiner 1024 determines whether or not all the combination blocks of the input or output connection targets or all the input and outputs can be combined. This determination corresponds to the determination A4 described above. In a case in which it is determined that all the combination blocks or all the input and outputs can be combined (Step S116: Yes), the process proceeds to the process of Step S120. On the other hand, in a case in which it is determined that an input or output connection target that cannot be combined is present (Step S116: No), the process proceeds to the process of Step S118.

(Step S118) The engineering data determiner 1024 generates a predetermined warning message representing the detection of an input or output connection target that cannot be combined and outputs the generated warning message to the operation display 106 so as to be displayed on the operation display 106. In the warning message, information of the name or the like of the input or output connection target that cannot be combined is included. The warning message, for example, includes a text string of "Warning: inappropriate combination is present in CCC." The engineering data determiner 1024 may display the position of the functional block or an input and output that is a corresponding input or output connection target on the editor screen. The engineering data determiner 1024 may store the warning message in the storage 104 and may accumulate the warning message as a part of a warning log. Thereafter, the process proceeds to the process of Step S120.

(Step S120) The engineering data determiner 1024 outputs a determination end message to the operation display 106 so as to be displayed on the operation display 106. The determination end message, for example, includes a text string of "Determination End." Thereafter, the process proceeds to the process of Step S122.

(Step S122) The engineering data determiner 1024 determines whether or not mismatching has been detected. In a case in which mismatching has not been detected (Step S122: Yes), the process proceeds to the process of Step S124. On the other hand, in a case in which mismatching has been detected (Step S122: No), the process shown in FIG. 7 ends.

(Step S124) The engineering data determiner 1024 stores checking information representing that mismatching has not been detected for the data file group relating to the control apparatus 14 in the storage 104. In this way, the engineering data processor 1022 performs a binary conversion of the data file relating to the control apparatus of which the checking information is stored and can output the acquired data file to the control apparatus. Thereafter, the process shown in FIG. 7 ends.

In the description presented above, while a case in which the engineering apparatus 10 executes the process shown in FIG. 7 has been described as an example, the engineering apparatus 20 may execute the process shown in FIG. 7. For a data file relating to a newly-generated engineering data, the process of Step S106 may be omitted. In the process shown in FIG. 7, while a case in which the determinations A1 to A4 are executed for an application module in Steps S108 to S118 has been described as an example, in a case in which input and output data is included in the differential file, the processes of the determinations B1 to B3 may be performed.

In the determination B1, in a case in which it is determined that missing is present in the input and output setting, the engineering data determiner 1024 may generate a predetermined warning message representing the detection of missing in the input and output setting and display the generated predetermined warning message on the operation display 106. In the warning message, among the information included in the differential file, the information of the name or the like of the input and output functional block relating to the input and output setting is included. The warning message, for example, includes a text string of "Warning: no input and output setting is present in CCC." The engineering data determiner 1024 may display the position of a corresponding input and output functional block on the editor screen. The engineering data determiner 1024 may store the warning message in the storage 104 and accumulate the warning message as a part of the warning log.

In the determination B2, in a case in which it is determined that there are overlapping installation positions in the determination B2, the engineering data determiner 1024 may generate a predetermined warning message representing the detection of the overlapping installation positions and display the generated predetermined warning message on the operation display 106. In the warning message, among the information included in the differential file, the input and output functional block relating to the input and output setting and the name or the like of the installation position are included. The warning message, for example, includes a text string of "Warning: there is overlapping in the input and output setting of DDD." The engineering data determiner 1024 may display the position of a corresponding input and output functional block on the editor screen. The engineering data determiner 1024 may store the warning message in the storage 104 and accumulate the warning message as a part of the warning log.

In the determination B3, in a case in which it is determined that there is an input and output setting not matching the type of data in the determination B3, the engineering data determiner 1024 may generate a predetermined warning message representing the detection of the input and output setting and display the generated predetermined warning message on the operation display 106. In the warning message, among the information included in the differential file, information of the name or the like of the input and output data is included. The warning message, for example, includes a text string of "Warning: type of input and output data of EEE is inappropriate." The engineering data determiner 1024 may display the position of a corresponding input and output functional block on the editor screen. The engineering data determiner 1024 may store the warning message in the storage 104 and accumulate the warning message as a part of the warning log.

The determination and the display and storage of the warning message may be executed by the engineering data determiner of the engineering apparatus 20.

The input and output path between the functional blocks may be applied to a relation between a class module and an instance module described in object oriented programming. The class module is a model of a control logic defined in advance. The instance module is a specific example of the individual control logic. In other words, the control logic represented as an instance module by an individual application module according to this embodiment is represented using a predetermined module, which is stored in a definition file defined in advance, that is the reference target and differential information from the class module. As the class module, for example, a typical control logic for each number of input and output systems is defined. As the instance module, a control logic for controlling a plurality of plants 15 of which the number of input and output systems and the control logic are common is used. When a program in an execution form output from generated engineering data to the control apparatus is built using an instance module, the engineering data processor 1022 refers to the class module that is a reference target and specifies a control logic used as an instance module from the class module and the individual differential information.

Thus, information of a part of input or output connection target of each input and output path between functional blocks is defined in the definition file in advance such that the mismatching described above does not occur. The engineering data processor of each of the engineering apparatuses 10 and 20 generates an individual application module (instance module) in which differential information including the information of an input or output connection target of the input and output path according to the control logic of individual plant 15 is stored. Thus, when the engineering data determiner 1024 executes one or both of the determination of A1 to A4 and the determination of B1 to B3 described above, the engineering data determiner 1024 sets an individual application module in which the differential information is described as a processing target. In this way, the process relating to the detection of mismatching is reduced.

(Summarization)

As described above, the engineering apparatus 10 according to this embodiment is an engineering apparatus that is used for supporting engineering of the control apparatus 14 executing control of an industrial plant. The engineering apparatus 10 includes the storage 104 storing the first data file group formed from data files storing element information representing functional blocks that are constituent elements of the control apparatus 14 and the engineering data processor 1022 changing the element information stored in the data files. The engineering apparatus 10 includes the engineering data determiner 1024 that acquires a second data file group formed from data files storing changed element information in another engineering apparatus 20, extracts differential files that are data files storing the changed element information from each of the first data file group and the second data file group, and determines at least one of presence/absence of mismatching between functional blocks represented by the element information stored in the differential files and presence/absence of mismatching of an input and output path between functional blocks.

According to such a configuration, the engineering data is transitioned in units of control apparatuses, and data files storing information changed through the engineering are individually specified. For this reason, the efficiency of the operation relating to the transition of the engineering data between control systems installed at different places is increased. For example, conventionally, although there are cases in which the engineering data of the whole control system is transitioned between the on-site control system 1 and a replicated control system 2, the volume of the engineering data that is a transition target is large, and accordingly, it is difficult to execute transition through communication such as file attachment to an electronic mail or the like. In contrast to this, in the engineering apparatus 10 according to this embodiment, the transition of the engineering data is executed more easily and quickly. A required time until the start of engineering and a time required at the time of repeating the engineering can be shortened.

Conventionally, when engineering data corrected by the replicated control system 2 is applied to the on-site control system 1, an engineer extracts a part to be reflected on the on-site control system 1, and an operation for the arrangement is necessary. Particularly, in a case in which there is a large amount of the engineering data, there are cases in which person's mistakes in the operation are occurred, and, in order to accurately reflect the corrected contents on the on-site control system 1, extreme care is necessary. In contrast to this, the engineering apparatus 10 according to this embodiment specifies information to be reflected by a data file storing the changed information as a stored data file. For this reason, the occurrence of person's mistakes until the information is reflected on the control apparatus 14 of the on-site control system 1 can be prevented.

Mismatching between the functional blocks and the input and output paths represented by the information changed through engineering is specified. As mismatching between the functional blocks, overlapping between the names of the functional blocks or the inappropriateness of a type of functional block that is an input or output connection target designated in the input and output path is determined, and, as mismatching of an input and output path between functional blocks, a state including at least one of overlapping and missing of functional blocks that are input or output connection targets designated in the input and output path is determined. For this reason, even when the control system has a large scale or becomes complicated, mismatching cannot be determined, and accordingly, the need for re-trying the engineering is lowered, and the efficiency of an operation relating to the engineering can be increased.

When the engineering data determiner 1024 determines that there is no mismatching between functional blocks and input and output paths, the engineering data processor 1022 integrates a differential file and a data file storing element information that has not been changed and outputs the integrated data file to the control apparatus 14. In other words, since the matching between functional blocks and the input and output paths is checked before a corrected content is reflected on the control apparatus 14 of the on-site control system 1, the plant 15 can be controlled by the control apparatus 14 more reliably.

While preferred embodiments of the invention have been described above with reference to the drawings, it should be understood that these are exemplary of the invention and are not to be considered as limiting. Various modifications can be made without departing from the spirit or scope of the present invention.

What is claimed is:

1. An engineering apparatus that is used for supporting engineering of facilities in an industrial plant, the engineering apparatus comprising:

a storage storing a first data file group including first data files, the first data files including element information indicating one or a plurality of functional blocks that are constituent elements of a control logic for controlling operation of the industrial plant;

a processor configured to change the element information included in the first data files; and a determiner configured to:
   acquire, as differential files, a changed first data file group including changed first data files among the first data files included in the first data file group, the changed first data file group including changed element information changed by the engineering apparatus, and a changed second data file group including changed second data files, the changed second data files including the changed element information changed by another engineering apparatus; and
   generate an updated file group by aggregating the differential files and unchanged data files of the first data file group that do not include changed information; and
   determine whether there is mismatching between functional blocks indicated by the element information included in the updated file group,
wherein
the determiner is configured to determine whether there is mismatching in an input and output path between the functional blocks,
the mismatch of the input and output path between the functional blocks indicates a state including at least one of overlapping and missing of functional blocks that are input or output connection targets designated in the input and output path,
the determiner is configured to determine that there is overlapping between the names of the input and output paths and there is mismatching in the input and output path between the functional blocks in a case where a plurality of input and output paths having a common name are included in an application module belonging to the updated file group, and
the determiner is configured to determine that there is no overlapping between the input and output paths and there is no mismatching in the input and output path between the functional blocks in a case where there is no plurality of input and output paths having a common name in the application module belonging to the updated file group.

2. The engineering apparatus according to claim 1, wherein
the mismatching between the functional blocks indicates overlapping names of the functional blocks or inappropriateness of a type of a functional block that is an input or output connection target designated in the input and output path.

3. The engineering apparatus according to claim 1, wherein
the storage stores a definition file including previously defined information, the previously defined information indicating a part of input and output paths between the functional blocks, and
each of the first data file group and the second data file group includes an individual file including information of another part of the input and output paths, and
the determiner is configured to detect mismatching between the input and output paths from the information of the another part of the input and output paths included in the individual file among the differential files.

4. The engineering apparatus according to claim 1, wherein
the data file is formed for each control loop of a control apparatus used for controlling operation of the industrial plant.

5. The engineering apparatus according to claim 1, wherein
the data file is formed for each combination of a plurality of control loops of a control apparatus used for controlling operation of the industrial plant.

6. The engineering apparatus according to claim 4, wherein
the first data file group further includes a third data file, the third data file including an input and output setting of a field device for each control loop,
the second data file group further includes a fourth data file, the fourth data file including the input and output setting, and
the determiner is configured to:
extract second differential files including a changed input and output setting from each of the first data file group and the second data file group; and
detect mismatching of the input and output setting included in the extracted second differential files.

7. The engineering apparatus according to claim 4, wherein
the first data file group further includes a third data file, the third data file including an input and output setting of a field device for each control loop,
the second data file group further includes a fourth data file, the fourth data file including the input and output setting, and
the determiner is configured to:
extract second differential files including a changed input and output setting from each of the first data file group and the second data file group; and
detect mismatching between the input and output setting included in the extracted second differential files and the input and output path of the functional block indicated by the element information included in the differential file.

8. The engineering apparatus according to claim 1, wherein
the processor is configured to integrate the differential file and the data file including the element information that has not been changed and input an integrated file into a control apparatus used for controlling operation of the industrial plant in a case that the determiner determines that there is no mismatching between the functional blocks and the input and output path.

9. An engineering method using an engineering apparatus that is used for supporting engineering of facilities in an industrial plant and comprises a storage storing a first data file group including first data files, the first data files including element information indicating one or a plurality of functional blocks that are constituent elements of a control logic for controlling operation of the industrial plant, the engineering method comprising:
changing the element information included in the first data files;
acquiring, as differential files, a changed first data file group including changed first data files among the first data files included in the first data file group, the changed first data file group including changed element information changed by the engineering apparatus, and a changed second data file group including changed second data files, the changed second data files including the changed element information changed by another engineering apparatus;
generating an updated file group by aggregating the differential files and unchanged data files of the first data file group that do not include changed information; and
determining whether there is mismatching between functional blocks indicated by the element information included in the updated file group,
wherein
the engineering method further comprising determining whether there is mismatching in an input and output path between the functional blocks,
the mismatch of the input and output path between the functional blocks indicates a state including at least one of overlapping and missing of functional blocks that are input or output connection targets designated in the input and output path,
determining whether there is mismatching in the input and output path between the functional blocks comprises determining that there is overlapping between the names of the input and output paths and there is mismatching in the input and output path between the functional blocks in a case where a plurality of input and output paths having a common name are included in an application module belonging to the updated file group, and
determining whether there is mismatching in the input and output path between the functional blocks comprises determining that there is no overlapping between the input and output paths and there is no mismatching in the input and output path between the functional blocks in a case where there is no plurality of input and output paths having a common name in the application module belonging to the updated file group.

10. The engineering method according to claim 9, wherein
the mismatching between the functional blocks indicates overlapping names of the functional blocks or inappropriateness of a type of a functional block that is an input or output connection target designated in the input and output path.

11. The engineering method according to claim 9, wherein
the storage stores a definition file including previously defined information, the previously defined information indicating a part of input and output paths between the functional blocks, and
each of the first data file group and the second data file group includes an individual file including information of another part of the input and output paths, and
determining whether there is mismatching in the input and output path between the functional blocks comprises detecting mismatching between the input and output paths from the information of the another part of the input and output paths included in the individual file among the differential files.

12. The engineering method according to claim 9, wherein
the data file is formed for each control loop of a control apparatus used for controlling operation of the industrial plant.

13. The engineering method according to claim 9, wherein the data file is formed for each combination of a plurality of control loops of a control apparatus used for controlling operation of the industrial plant.

14. The engineering method according to claim 12, wherein
the first data file group further includes a third data file, the third data file including an input and output setting of a field device for each control loop,
the second data file group further includes a fourth data file, the fourth data file including the input and output setting, and
the engineering method further comprises:
extracting second differential files including a changed input and output setting from each of the first data file group and the second data file group; and
detecting mismatching of the input and output setting included in the extracted second differential files.

15. The engineering method according to claim 12, wherein
the first data file group further includes a third data file, the third data file including an input and output setting of a field device for each control loop,
the second data file group further includes a fourth data file, the fourth data file including the input and output setting, and
the engineering method further comprises:
extracting second differential files including a changed input and output setting from each of the first data file group and the second data file group; and
detecting mismatching between the input and output setting included in the extracted second differential files and the input and output path of the functional block indicated by the element information included in the differential file.

16. The engineering method according to claim 9, further comprising:
integrating the differential file and the data file including the element information that has not been changed and input an integrated file into a control apparatus used for controlling operation of the industrial plant in a case that it is determined that there is no mismatching between the functional blocks and the input and output path.

17. A non-transitory computer-readable storage medium storing a program, which when executed by a computer of an engineering apparatus that is used for supporting engineering of facilities in an industrial plant and comprises a storage storing a first data file group including first data files, the first data files including element information indicating one or a plurality of functional blocks that are constituent elements of a control logic for controlling operation of the industrial plant, causes the computer to:
change the element information included in the first data files;
acquire, as differential files, a changed first data file group including changed first data files among the first data files included in the first data file group, the changed first data file group including changed element information changed by the engineering apparatus, and a changed second data file group including changed second data files, the changed second data files including the changed element information changed by another engineering apparatus;
generate an updated file group by aggregating the differential files and unchanged data files of the first data file group that do not include changed information; and
determine whether there is mismatching between functional blocks indicated by the element information included in the updated file group,
wherein the program further causes the computer to determine whether there is mismatching in an input and output path between the functional blocks,
the mismatch of the input and output path between the functional blocks indicates a state including at least one of overlapping and missing of functional blocks that are input or output connection targets designated in the input and output path,
determining whether there is mismatching in the input and output path between the functional blocks comprises determining that there is overlapping between the names of the input and output paths and there is mismatching in the input and output path between the functional blocks in a case where a plurality of input and output paths having a common name are included in an application module belonging to the updated file group, and
determining whether there is mismatching in the input and output path between the functional blocks comprises determining that there is no overlapping between the input and output paths and there is no mismatching in the input and output path between the functional blocks in a case where there is no plurality of input and output paths having a common name in the application module belonging to the updated file group.

* * * * *